Jan. 4, 1966  E. T. GETZ ETAL  3,226,995
PULLEY SYSTEM
Filed Aug. 7, 1964
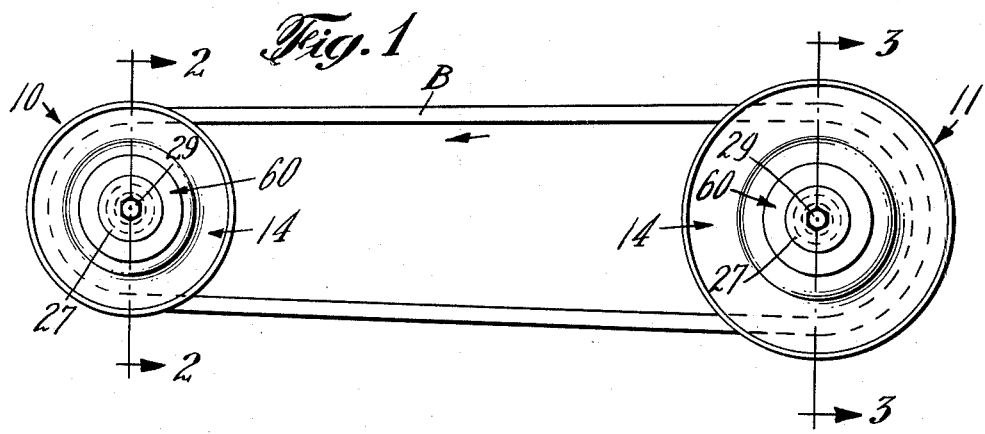
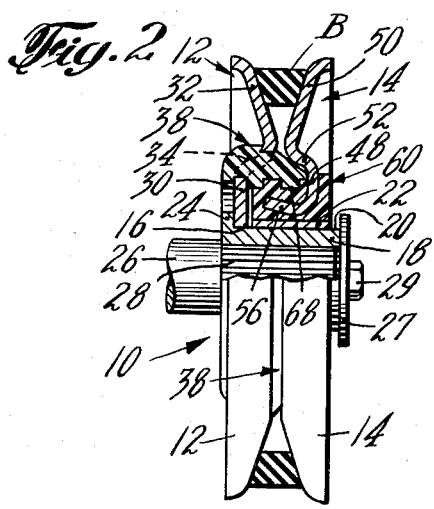
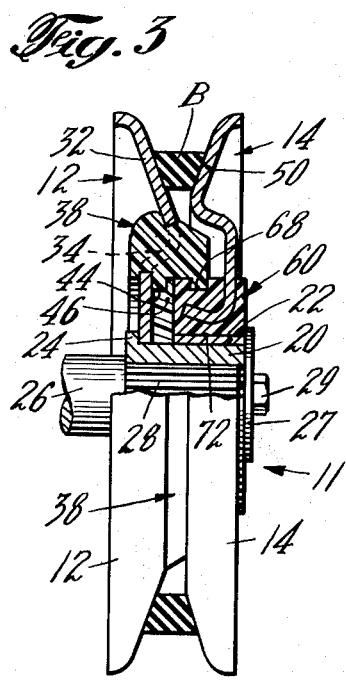
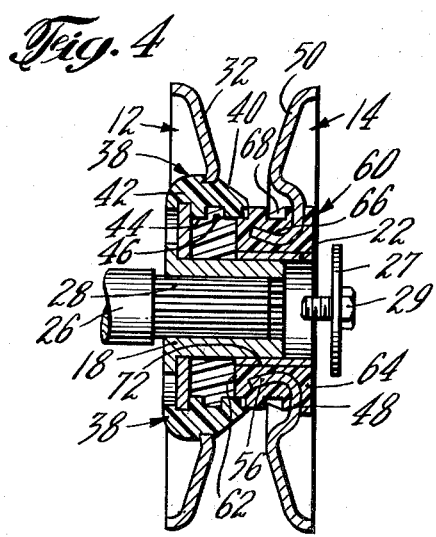
INVENTORS
EDWARD T. GETZ
BY MATTHEW PACAK

United States Patent Office 3,226,995
Patented Jan. 4, 1966

3,226,995
PULLEY SYSTEM
Edward T. Getz, Cleveland Heights, and Matthew Pacak, Solon, Ohio, assignors to Eaton Manufacturing Company, Cleveland, Ohio, a corporation of Ohio
Filed Aug. 7, 1964, Ser. No. 388,129
9 Claims. (Cl. 74—230.17)

The present invention relates, generally, to a pulley system comprising a plurality of uni-directional, self-compensating, torque-transmitting devices of the pulley type.

More particularly, this invention relates to a pulley system comprising a plurality of uni-directional, self-compensating, torque-transmitting apparatus of the pulley type that are so constructed and arranged as to automatically uni-directionally compensate for slippage occuring between the sheave halves thereof, and driving means engageable therewith, such slippage being the result of increased loads imposed upon the system during the operation thereof over an extended period of time, enabling a maximum variance in the number of revolutions per minute of one of said apparatus, defining a driven pulley, as the other one thereof, defining a driver, as rotated in opposite direction.

Heretofore, numerous self-compensating pulley apparatus have been suggested which utilize the basic principle of providing control means cooperable with the pulley. The control means, upon response to slippage or drag occurring at increased loads on the pulley, will reduce the axial distance between the sheave halves in an effort to increase the working or effective pitch diameter of the pulley. Accordingly, the control means will relieve the slack in the belt or similar driving means passing between the sheave halves. The particular application of a self-compensating pulley is particularly desirable in situations where it is necessary to take up slack or slippage in belt-type driving means extending between the sheave halves. When the use of a flexible belt as a driving means is extensive and variations in loads are continuous, stretching or similar permanent deformation of the belt will occur. As a result, the overall length of the belt is increased to reduce the tension thereof, and thus slippage between the sheave halves occurs to thereby reduce the load-carrying capabilities of the pulley.

The use of such self-compensating pulley apparatus as has heretofore been suggested becomes significantly important in a system comprising a plurality thereof, wherein it is desirable that maximum variation in the number of revolutions per minute of a driven pulley that is structurally operatively associated with a load be obtained as the driver is rotatably translated in a plurality of oppositely disposed directions. Thus, it may be desired to present a pulley system in which a driven pulley is capable of one revolutionary speed when the driver is rotated in one of a plurality of directions, and a widely divergent, or maximum variance in the revolutionary speed of the driven pulley when the driver is rotated in another of said plurality of directions. When the use of such pulley apparatus as has heretofore been suggested is used in such a system, it has been found that the aforesaid control means is generally inefficient, with the result that the maximum variation in the number of revolutions per minute of the driven pulley as the driver is rotatably moved in each one of a plurality of oppositely disposed directions is incapable of being achieved.

Accordingly, having in mind each and every one of the aforesaid disadvantages, and others that will be readily apparent to those skilled in the art, it is a primary object of the present invention to provide a pulley system comprising a plurality of uni-directional, self-compensating, torque-transmitting apparatus of the pulley type that are so constructed and arranged as to automatically, uni-directionally compensate for slippage occurring between the sheave halves thereof, and driving means engageable therewith, such slippage being the result of increased loads imposed upon the system during the operation thereof over an extended period of time, enabling a maximum variance in number of revolutions per minute of one of said apparatus, defining a driven pulley, as the other one thereof, defining a driver, is rotated in each of a plurality of oppositely disposed directions.

Another primary object of this invention is to provide a pulley system comprising a plurality of uni-directional, self-compensating, torque-transmitting apparatus of the pulley type that are so constructed and arranged as to automatically uni-directionally compensate for slippage occurring between the sheave halves thereof, and driving means engageable therewith, such slippage being the result of increased loads imposed upon the system during the operation thereof over an extended period of time, enabling a maximum variance in the number of revolutions per minute of one of said apparatus, defining a driven pulley, as the other one thereof, defining a driver, as rotated in opposite directions, such compensating apparatus being further so constructed and arranged as to unusually efficiently automatically compensate for lengthening of the aforesaid driving means comprising a belt extending between said pulley apparatus.

Yet another primary object of the present invention is to provide a pulley system comprising a plurality of uni-directional self-compensating, torque-transmitting apparatus of the pulley type that are so constructed and arranged as to automatically, uni-directionally compensate for slippage occurring between the sheave halves thereof, and driving means engageable therewith, such slippage being the result of increased loads imposed upon the system during the operation thereof over an extended period of time, enabling a maximum variance in the number of revolutions per minute of one of said apparatus, defining a driven pulley, as the other one thereof, defining a driver, as rotated in opposite directions, said compensating apparatus being further so constructed and arranged as to unusually efficiently automatically compensate for lengthening of the aforesaid driving means comprising a belt extending between said pulley apparatus, substantially irrespectively of the direction of travel of said driving means, said pulley apparatus comprising compensating means being disposed radially of the hub of each pulley apparatus and completely axially and annularly encompassing at least a portion of a plurality of sheave halves, to enable any forces directly or indirectly imposed upon the compensating means to be unusually efficiently transmitted to and distributed among the various component parts of the pulley apparatus.

Furthermore, it is a primary object of this invention to provide a pulley system comprising a plurality of uni-directional, self-compensating, torque-transmitting apparatus of the pulley type that are so constructed and arranged as to automatically uni-directionally compensate for the slippage occurring between the sheave halves thereof, and driving means engageable therewith, such slippage being the result of increased loads imposed upon the system during the operation thereof over an extended period of time, enabling a maximum variance in the number of revolutions per minute of one of said apparatus, defining a driven pulley, as the other one thereof, defining a driver, as rotated in opposite directions, said compensating apparatus being further so constructed and arranged as to unusually efficiently automatically compensate for the lengthening of the aforesaid driving means comprising a belt extending between such pulley apparatus, substantially irrespectively of the direction of travel of said driving means, said pulley apparatus comprising compensating means, being disposed radially of the hub of each pulley apparatus and completely axially and annularly encompassing at least a portion of a plurality of sheave halves, to enable any forces directly or indirectly imposed upon the compensating means to be unusually efficiently transmitted to and distributed among the various component parts of the pulley apparatus, said compensating means comprising a plurality of inserts, each of which is mutually, cooperatively engageable and structurally operatively associated with a corresponding one of a plurality of sheave halves in any suitable manner, as by a process of moulding one with respect to the other, thereby disposing the inserts radially of the hub of each pulley apparatus and completely axially and annularly encompassing at least a substantial portion of each of the sheave halves, to enable any forces directly or indirectly imposed on the inserts to be unusually efficiently transmitted to and distributed throughout the various component parts of the pulley apparatus.

Still further, it is a primary object of the present invention to provide a pulley system comprising a pair of uni-directional, self-compensating, torque-transmitting pulleys, each comprising compensating means that is so constructed and arranged as to unusually efficiently uni-directionally automatically compensate for lengthening of the belt-type driving means irrespective of the direction of travel thereof, one of said compensating means being operable when the driving means travels in one of a plurality of directions, and the other of said compensating means being operable when the driving means travels in another of said plurality of directions, enabling said pulley system to present maximum variance in the number of revolutions per minute of one of said pulleys, defining a driven pulley, as the other pulley, is alternately rotatably moved in each of said plurality of directions.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

In the drawing:

FIGURE 1 is a side elevational view of a self-compensating torque-transmitting pulley system constructed in accordance with the principles of the present invention;

FIGURE 2 is an enlarged sectional view taken substantially along line 2—2 of FIGURE 1;

FIGURE 3 is an enlarged sectional view taken substantially along line 3—3 of FIGURE 1; and FIGURE 4 is a view similar to FIGURE 2, showing the components of the pulley in separated, but aligned relationship.

The pulley apparatus utilized in the novel pulley system of the instant application is substantially similar in construction and operation to the pulley apparatus disclosed in United States application, Serial No. 307,983, filed September 10, 1963, and entitled, "Pulley Apparatus."

Attention is now directed to FIGURE 1 of the drawing, wherein there is illustrated a pulley system comprising a pair of self-compensating or automatically compensating, torque-transmitting pulleys 10 and 11 on which a belt B or other similar drive means is drivingly disposed. The pulley 10 is drivingly coupled to a reversible motor (not shown) and serves to drive the pulley 11 through the belt-type driving means B.

Referring now to FIGURES 2 through 4, each of the pulleys 10 and 11 comprises a plurality of sheave halves 12 and 14. The sheave half 12 is provided with a generally centrally disposed circular opening or aperture 16. An axially extending, annular or generally cylindrical hub portion 18 is disposed within the opening 16 and is non-rotatably secured therein with respect to the sheave half 12 in any suitable manner, as by press-fitting, staking or any other suitable operation. The hub portion 18 has a bearing surface 20 extending completely annularly about the external periphery thereof, with the bearing surface 20 being rotatably, mutually cooperatively engageable with an annular or generally cylindrical bushing 22. The bushing 22 completely annularly encompasses the hub portion 18 substantially throughout the full longitudinal dimensional extent thereof in order to define a substantial bearing surface therebetween.

The hub portion 18 comprises a radially outwardly extending, generally annular flange portion 24 at one end thereof which is mutually cooperatively engageable with one side of the sheave half 12 in order to predetermine the position of the sheave half 12 with respect to the hub portion 18. In addition to being generally cylindrical, the hub portion 18 is of tubular configuration and is non-rotatably, structurally operatively associated with a shaft 26. To this end, the hub portion 18 and the shaft 26 are each provided with splines 28, with the hub portion 18 being positioned with respect to the end of the shaft 26 by any conventional retaining means, such as a washer 27 and a threaded retaining bolt 29. It is to be understood, however, that any other suitable means for non-rotatably connecting the hub portion 18 to the shaft 26 may be used, such as a key arrangement or press-fit. A further function of the washer 27 is to limit axial movement of the sheave half 14 with respect to the sheave half 12, as will be apparent from the discussion hereinafter.

The shaft 26 of pulley 10 provides a power input for the driving pulley 10, since it is connected to a reversible motor (not shown), and the shaft 26 for the pulley 11 provides a power output therefrom to any desired location of use (also not shown).

The sheave half 12 is of generally annular or substantially circular configuration and further comprises a generally centrally disposed first planar portion 30 and a second or angular planar portion 32. The second planar portion 32 is angularly disposed with respect to the first planar portion 30 and is positioned radially outwardly thereof. The angle defined between each of the planar portions 30 and 32, preferably is less than 45 degrees and of the order of approximately 20 degrees. The planar portions 30 and 32 are integrally connected to each other by a curvilinear rib 34 positioned and extending between the planar portions and integrally connected thereto.

As shown in FIGURES 2 through 4, an insert 38 is non-rotatably, mutually cooperatively engageable and structurally operatively associated with the sheave half 12. The insert 38 may be fabricated of any suitable material, such as plastic, and preferably is fabricated of nylon. In this manner, the insert 38 can be subjected to a suitable molding process so that the plasticized or synthetic material of the insert flows into intimate contact with the sheave half 12. The sheave half 12 could be provided with slots (not shown) or tab means (also not shown) to aid in creating a better bond between the insert and the sheave half, as disclosed in the above identified application S.N. 307,983.

The insert 38 comprises a front face 40 and a rear face 42 angularly disposed with respect to the front face 40, the angular extent of which should be less than 45 degrees and preferably of the order of approximately 30 degrees. The insert 38 completely encompasses a substantial portion of the sheave half 12 axially thereof, that is, in a direction axially of the sheave half or along the longitudinal axis of the hub portion 18; radially thereof, that is, in a direction generally perpendicularly disposed with respect to the aforementioned axis; and completely annularly thereabout. In accordance with this construction, the insert 38 is rigidly keyed, that is, mutually cooperatively engageable and structurally operatively associated, to the sheave half 12 for conjoint rotation therewith. The insert 38 is further provided with a generally centrally disposed bore 44 which extends completely therethrough and has internal threads 46 formed in the bore 44 for a purpose to be described hereinafter.

The sheave half 14 of each of the pulleys 10 and 11 comprises a first planar portion 48 disposed centrally thereof, a second angular planar portion 50 angularly disposed with respect to the first planar portion 48, and an imperforate rib 52 positioned and extending between the planar portions 48 and 50 and integrally connected thereto. The angular extent between the planar portions 48 and 50 preferably is less than 45 degrees and of the order of approximately 20 degrees. In fabricating the sheave half 14, it is provided with a plurality of tab members or tabs 56, which are bent, folded or otherwise formed outwardly of the plane of the planar portion 48 to such an extent as to be preferably acutely angularly disposed with respect thereto.

An insert 60 is provided which is non-rotatably, mutually cooperatively engageable and structurally operatively associated with the sheave half 14. The insert 60 may be fabricated of any suitable material, such as a plastic, and preferably is fabricated of nylon, as is the insert 38. In this manner, the insert 60 may be subjected to a suitable molding process to enable portions of the plasticized or synthetic material from which the insert is fabricated to flow into intimate bonding contact with the planar portion 48 and the tabs 56 of the sheave half 14.

It will be understood, therefore, that the insert 60 comprises a front face 62 and a rear face 64 disposed in generally parallel relationship with respect to the front face 62, so that the insert 60 is formed on both sides of the sheave half 14. The insert 60 thus completely encompasses a substantial portion of the sheave half 14 axially thereof, that is, in a direction axially of the sheave half 14 or along the longitudinal axis of the hub portion 18; radially thereof, that is, in a direction generally perpendicularly disposed with respect to the aforementioned axis; and completely annularly thereabout. In accordance with this construction, the insert 60 is rigidly keyed, that is, mutually cooperatively engageable and structurally operatively associated, to the sheave half 14 for conjoint rotation therewith. Relative movement between the insert 60 and the sheave half 14 is precluded, since cooling of the plastic material from which the insert 60 is formed, subsequent to the forming of the insert 60 upon the sheave half 14, shrinks the same to result in a snug fit in the curved area 66 of the tabs 56.

The insert 60 is further provided with an exteriorly threaded portion 68 that extends completely annularly about the periphery thereof. The threaded portion 68 is mutually cooperatively engageable with the internally threaded portion 46 of the insert 38, for purpose to be more fully described and disclosed hereinafter.

As pointed out above, each of the inserts 38 and 60 preferably is fabricated of nylon, and is subjected to a molding process to rigidly key it to the corresponding sheave halves 12 or 14. It is to be understood, however, that any suitable material may be used in fabricating the inserts 38 and 60. In determining the most suitable insert material for the instant application of the novel inventive concept, the characteristics of bearing quality wherein a low coefficient of friction is desirable, resiliency, reasonable dimensional stability, strength and the adaptability to be molded are taken into consideration. Of particular significance, a resilient material having a low coefficient of friction and presenting self-lubricating characteristics, thus being capable of functioning as a bearing surface, is preferred. Especially is such a material preferred in that inconsistent loading on a pulley structure results in considerable strain on the cooperating parts performing the self-compensating function, thereby tending to produce excessive noise under certain circumstances. The resilient nature of a plasticized material, such as nylon, suffices to provide a damping effect in the self-compensating unit and results in a comparatively noiseless pulley operation.

The sheave halves 12 and 14 may be fabricated of any suitable material and in any suitable manner. For example, the sheave halves 12 and 14 may be fabricated by means of a suitable stamping process and of a material such as metal or one that is similar to the material from which the inserts 38 and 60 are fabricated, in which latter case the stamping process will utilize heat.

When the sheave halves 12 and 14 are operatively associated with each other, as illustrated in FIGURES 2 through 4, the planar portions 30 and 48, respectively, are disposed generally in parallel relationship relative to each other. As a result, the angular planar portions 32 and 50, respectively, form a V-shaped groove completely annularly about each of the pulleys 10 and 11, within which the belt B or other similar drive means is disposed. Since, as pointed out above, the angular extent of the planar portions 32 and 50, with respect to the planar portions 30 and 48, respectively, is of the order of approximately 20 degrees, it will be seen that the angular extent of the V-shaped groove is of the order of approximately 40 degrees. It has been determined that a V-shaped groove having an angular extent of the order of approximately 36 degrees provides optimum results in this type of pulley apparatus.

As pointed out above, the bushing 22 completely annularly encompasses the hub portion 18 and is rotatably mutually cooperatively engageable with the bearing surface 20 of the hub portion 18. The bushing 22 is non-rotatably secured to the insert 60 in any suitable manner, as by means of a press-fit within a bore 72 disposed generally centrally of the insert 60 and extending therethrough. It will be seen, therefore, that the sheave half 12, in view of the non-rotatable engagement thereof with the hub portion 18, is rotatable with respect to the sheave half 14, in view of the latter's non-rotatable engagement with the bushing 22 and the rotatable relationship between the bushing 22 and the hub portion 18. Also, in addition to the rotatable relationship between the sheave halves 12 and 14, the same are axially movable with respect to each other, in view of the mutual cooperative engagement between the threaded portions 46 and 68 of the inserts 38 and 60, respectively.

Referring now to FIGURES 2 and 4, it will be noted that the threaded portions 46 and 68 of the driving pulley 10 are right-hand threaded portions, that is, when there is a relative rotation in a clockwise direction between the sheave halves 12 and 14, they will move axially toward each other under the influence of the threaded inserts 38 and 60, and if there is relative rotation between the sheave halves 12 and 14 in a counter-clockwise direction, they will move away from each other.

As shown in FIGURE 3, the threaded portions 48 and 60 of the driven pulley 11, on the other hand, are left-hand threaded portions, that is, when there is relative rotation between the sheave halves 12 and 14 in a clockwise direction, the sheave halves will move axially away from each other, and when there is relative rotation between them in a counter-clockwise direction they will axially move towards one another under the influence of the threaded inserts 38 and 60. It will thus be seen that the inserts 38 and 60 of the pulley 10 are threaded oppositely to the inserts 38 and 60 of the driven pulley 11, so that the pulley 10 will compensate for the lengthening of the belt-type drive means B when it moves in one direction, and the pulley will compensate for the lengthening of the belt-type drive means B when it moves in the opposite direction, as more fully described hereinafter.

In the operation of the pulley system of the present invention, it will be understood that the inserts 38 and 60 of each of the pulleys 10 and 11 comprise uni-directional, automatic compensating means for maintaining the proper tension in the drive belt or drive means B, enabling the presentation of a maximum variation in the number of revolutions per minute of the pulley 11, defining a driven pulley, which is structurally operatively associated with a load (not shown) of any suitable type, when the pulley 10 defining a driving pulley, is rotatably moved in each one of a plurality of oppositely disposed directions.

Thus, loss or lack of tension in the drive belt B is normally induced owing to lengthening thereof during periods of extended usage. With reference first to the pulley 10, keeping in mind that the threads or threaded portions 46 and 68 of the inserts 38 and 60 are, respectively, right-hand threads, and assuming first that the driving pulley 10 is being rotatably moved in a generally counter-clockwise direction, as by means of a reversible motor (not shown) structurally operatively associated therewith, it will be understood that any loss of tension in the belt B will produce slack therein, enabling the belt to slip on or with respect to the sheave half 12. This is true since the frictional force therebetween is overcome by the non-rotatable relationship between this sheave half and the shaft 26, by means of the hub portion 18. However, since the sheave half 14 is rotatably associated with the aforesaid shaft, as by means of the bushing 22, the frictional force between the belt B and this sheave half will cause rotation thereof relative to the sheave half 12. Since the threaded portions 46 and 68 are right-hand threads, and since the driving pulley is being rotatably moved in a generally counter-clockwise direction, as hereinbefore pointed out, the relative movement between the sheave halves 12 and 14 will be in a direction away from one another, enabling this pulley to present a minimum pitch diameter.

When, however, the driving pulley 10 is rotatably moved in a generally clockwise direction, the sheave halves 12 and 14 will relatively move in a direction towards one another, under the influence of the frictional force between the belt B and the sheave half 14, since, as hereinbefore pointed out, the threaded portions 46 and 68 are right-hand threads. Thus, the pitch diameter will increase to efficiently compensate for any slack introduced into the belt B as a result of the loss of tension therein. Accordingly, it will be seen that the pulley 10 is so constructed and arranged as to automatically compensate for loss of tension in the belt B, but only when the pulley is rotatably moved in one of a plurality of directions. The pulley 10 is, therefore, a uni-directionally, self-compensating, torque-transmitting device of the pulley type.

The pulley 11 as well is a uni-directionally, self-compensating, torque-transmitting device of the pulley type. However, the pulley 11 will automatically compensate for loss of tension in the belt B only when it is rotatably moved in a generally counter-clockwise direction, as opposed to the pulley 10 which automatically compensates when rotatably moved in a generally clockwise direction, as hereinbefore pointed out.

Accordingly, it will now be seen that a pulley system is provided comprising a plurality of uni-directionally, self-compensating, torque-transmitting devices of the pulley type, one of which is so constructed and arranged as to automatically compensate for loss of tension in a belt-type of driving means extending therebetween when rotatably moved in one of a plurality of directions, and the other of which is so constructed and arranged as to automatically compensate for the loss of tension in said driving means when the aforesaid devices are rotatably moved in another of said plurality of directions. Thus, only when the pulley 10 is being driven in a generally clockwise direction by the aforesaid reversible motor (not shown), and the drive belt or means B is advancing in a direction oppositely disposed with respect to that shown in FIGURE 1, the pulley 10 will serve as the uni-directional automatic compensating pulley, since a loss of tension in the drive belt B will result in slippage between the belt B and the sheave half 12 of the pulley 10, and cause a relative clockwise rotation between the sheave halves 12 and 14 of the pulley 10. This will result in an axial movement of the sheave halves 12 and 14 towards each other under the influence of the right-hand threaded inserts 38 and 60 of the pulley. The effective diameter of the pulley will thus be increased, and the drive belt will move radially outwardly to the compensated position shown in FIGURE 2.

If the pulley 10 is driven in the opposite or generally counter-clockwise direction by the reversible motor (not shown) to move the drive belt B in the direction indicated by the arrow in FIGURE 1, and there is a loss of tension in the belt B after a period of operation, there will be slippage between the belt B and the sheave half 12 of the driven pulley 11 (see FIGURE 3) and this will result in a relative counter-clockwise rotation between the sheave halves 12 and 14 of the pulley 11. This relative generally counter-clockwise movement will cause the sheave halves 12 and 14 of the pulley 11 to move relatively axially towards one another under the influence of the left-handed threaded portions 46 and 68 thereof, enabling the pulley 11 to uni-directionally automatically compensate for loss of tension in the belt B by increasing the effective diameter of this pulley, and, therefore restoring the proper degree of tension therein.

It is thus considered readily apparent that the instant pulley system, by comprising a pair of uni-directionally, self-compensating pulleys, each of which compensates in only one of and oppositely disposed ones of a plurality of directions, maintains the proper tension in the drive means or belt B substantially irrespectively of the direction of movement or advancement thereupon. In addition, it will now be understood that the pulley system of the present invention enables the presentation of a maximum variation in the number of revolutions per minute of one of the pulleys, comprising a driven pulley, as the other one of the pulleys, comprising a driving pulley, is alternately or alternatively rotatably moved or translated in each one of the aforesaid plurality of oppositely disposed directions. Thus, for example, if the aforesaid reversible motor (not shown) rotatably translated the driving pulley 10 at one revolutionary speed when translated in one of the aforesaid plurality of oppositely disposed directions, and at another revolutionary speed when driven in the other of said direction, the driven pulley 11, in turn, would be rotatably translated would be driven at revolutionary speeds proportionate to the revolutionary speed of the driving pulley in a corresponding one of the plurality of directions. And, the pulley system of the present invention will maintain this differential in revolutionary speeds as the reversible motor alternately or alternatively reverses the direction of rotational translation. That is, the maximum variance in rotational or revolutionary speeds will be maintained. This is particularly since, inasmuch as the pulley 10 automatically compensates for loss of tension in the belt B when rotatably translated in only one of a plurality of oppositely disposed directions, and the driven pulley 11 automatically compensates when rotatably translated in the other of said plurality of directions, each of the pulleys will present the maximum pitch diameter necessary to retain the proper tension in the driving means or drive belt B.

While a specific form of compensating pulley has been disclosed herein, it is to be noted that any type of oppositely compensating pulleys could be utilized in the instant pulley system without departing from the spirit and scope of the instant invention.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiment or modification intended to be reserved espectially as they fall within the scope of the claims here appended.

What is claimed is:
1. A pulley system comprising:
 a plurality of uni-directional, self-compensating, torque-transmitting pulleys,
 belt-type drive means extending over and between said pulleys,
 each of said pulleys comprising:
 a plurality of sheave halves defining the effective diameter of the respective pulley;
 a hub non-rotatably mutually cooperatively engageable with one of said sheave halves;
 another of said sheave halves being rotatably mutually cooperatively engageable with said hub to enable said sheave halves to be rotatably movably disposed with respect to each other;
 self-compensating means mutually cooperatively engageable and structurally operatively associated with said plurality of sheave halves for varying the effective diameter of the respective pulley;
 said self-compensating means comprising:
 one insert mutually cooperatively engageable and structurally operatively associated with one of said sheave halves; and
 another insert mutually cooperatively engageable and structurally operatively associated with another of said sheave halves, said inserts encompassing a substantial part of the respective sheave halves axially thereof, radially thereof and annularly thereabout;
 one of said inserts being interiorly threaded; and another of said inserts being exteriorly threaded;
 the threads of each of said inserts being disposed radially of said hub and being threadably mutually cooperatively engageable for disposing said plurality of sheave halves in axial movable relationship with respect to each other, enabling relative rotation of said sheave halves with respect to each other to cause axial movement therebetween to vary the effective diameter of the respective pulley;
 said compensating means for one of said pulleys having right-hand threaded inserts, and said compensating means for the other of said pulleys having left-hand threaded inserts; enabling one of said pulleys to automatically compensate for loss of tension in said drive means when rotatably translated in one of a plurality of oppositely disposed directions, and another of said pulleys to automatically compensate when rotatably translated in another of said plurality of directions, further enabling the maintenance of a maximum variation in the revolutionary speed of one of said pulleys, defining a driven pulley, as another one of said pulleys, defining a driven pulley, is alternatively rotatably translated in each of said plurality of directions.
2. The pulley system as defined in claim 1 wherein said inserts are comprised of a molded, plasticized material.
3. A pulley system comprising:
 a plurality of uni-directionally self-compensating, torque-transmitting pulleys;
 belt-type driivng means extending over and between said pulleys;
 each of said pulleys comprising:
 a plurality of sheave halves defining the effective diameter of the respective pulley;
 a hub non-rotatably mutually cooperatively engageable with one of said sheave halves;
 another of said sheave halves being rotatably mutually cooperatively engageable with said hub to enable said sheave halves to be rotatably movably disposed with respect to each other; and
 self-compensating means mutually cooperatively engageable and structurally operatively associated with said plurality of sheave halves for varying the effective diameter of the respective pulley;
 said compensating means being so constituted and arranged as to dispose said plurality of sheave halves in axial movable relationship with respect to each other and to encompass a substantial portion of said sheave halves axially thereof; generally radially thereof and substantially annularly thereabout,
 said compensating means for one of said pulleys being operable when said pulleys are rotated in one direction and said compensating means for the other of said pulleys being operable when said pulleys are rotated in the opposite direction; enabling one of said pulleys to automatically compensate for loss of tension in said drive means when rotatably translated in one of a plurality of oppositely disposed directions, and another of said pulleys to automatically compensate when rotatably translated in another of said plurality of directions, further enabling the maintenance of a maximum variation in the revolutionary speed of one of said pulleys, defining a driven pulley, as another one of said pulleys, defining a driven pulley, is alternatively rotatably translated in each of said plurality of directions.
4. The pulley system as defined in claim 3 wherein:
 each of said self-compensating means comprises:
 one insert mutually cooperatively engageable and structurally operatively associated with one of said sheave halves, and
 another insert mutually cooperatively engageable and structurally operatively associated with another of said sheave halves,
 each of said inserts having a portion disposed on one side and a portion disposed on another side of a corresponding one of said plurality of sheave halves and extending therebetween.
5. The pulley system as defined in claim 4 wherein:
 one of said inserts is exteriorly threaded, and
 the other of said inserts is interiorly threaded,
 the threads of each of said inserts being disposed radially outwardly of said hub and being threadably mutually cooperatively engageable for axially moving the sheave halves with respect to each other and varying the effective diameter of the respective pulley upon relative rotation between said sheave halves,
 the compensating means for one of said pulleys having right-hand threaded inserts, and the compensating means for the other of said pulleys having left-hand threaded inserts.
6. The pulley system as defined in claim 5 wherein said inserts of each of said compensating means are comprised of a molded plasticized material.
7. A pulley system comprising:
 a plurality of uni-directionally self-compensating, torque-transmitting pulleys;
 belt-type driving means extending over and between said pulleys;
 each of said pulleys comprising:
 a plurality of sheave halves defining the effective diameter of the respective pulley;
 a hub non-rotatably mutually cooperatively engageable with one of said sheave halves;
 another of said sheave halves being rotatably mutually cooperatively engageable with said hub to enable said sheave halves to be rotatably movably disposed with respect to each other; and
 self-compensating means mutually cooperatively engageable and structurally operatively associated with said plurality of sheave halves for varying the effective diameter of the respective pulley;
 said compensating means being so constituted and arranged as to dispose said plurality of sheave halves in axial movable relationship with respect to each other;
 said compensating means for one of said pulleys being operable when said pulleys are rotated in one direction, and said compensating means for the other of said pulleys being operable when said pulleys are rotated in the opposite direction; enabling one of said pulleys to automatically compensate for loss of tension in said drive means when rotatably translated in one of a plurality of oppositely disposed directions, and another of said pulleys to automatically compensate when rotatably translated in another of said plurality of directions, further enabling the maintenance of a maximum variation in the revolutionary speed of one of said pulleys, defining a driven pulley, as another one of said pulleys, defining a driven pulley, is alternatively rotatably translated in each of said plurality of directions.

8. A pulley system comprising:
a plurality of uni-directionally self-compensating, torque-transmitting pulleys,
belt-type driving means extending over and between said pulleys;
each of said pulleys comprising:
a plurality of sheave halves defining the effective diameter of the respective pulley;
said sheave halves being rotatably movably disposed with respect to each other; and
self-compensating means mutually cooperatively engageable and structurally operatively associated with said plurality of sheave halves for varying the effective diameter of the respective pulley;
said compensating means being so constituted and arranged as to dispose said plurality of sheave halves in axial movable relationship with respect to each other;
the compensating means of one of said pulleys being operable when said pulleys are rotated in one direction, and the compensating means for the other of said pulleys being operable when said pulleys are rotated in the opposite direction; enabling one of said pulleys to automatically compensate for loss of tension in said drive means when rotatably translated in one of a plurality of oppositely disposed directions, and another of said pulleys to automatically compensate when rotatably translated in another of said plurality of directions, further enabling the maintenance of a maximum variation in the revolutionary speed of one of said pulleys, defining a driven pulley, as another one of said pulleys, defining a driven pulley, is alternatively rotatably translated in each of said plurality of directions.

9. A pulley system comprising:
a plurality of uni-directionally self-compensating, torque-transmitting pulleys;
belt-type driving means extending over and between said pulleys;
each of said pulleys comprising:
a plurality of sheave halves defining the effective diameter of the respective pulley, said sheave halves being rotatably movably disposed with respect to each other;
self-compensating means mutually cooperatively engageable and structurally operatively associated with said plurality of sheave halves for varying the effective diameter of the respective pulley;
said compensating means for one of said pulleys being operable when said pulleys are rotated in one direction, and said compensating means for the other of said pulleys being operable when said pulleys are rotated in the opposite direction; enabling one of said pulleys to automatically compensate for loss of tension in said drive means when rotatably translated in one of a plurality of oppositely disposed directions, and another of said pulleys to automatically compensate when rotatably translated in another of said plurality of directions, further enabling the maintenance of a maximum variation in the revolutionary speed of one of said pulleys, defining a driven pulley, as another one of said pulleys, defining a driven pulley, as alternatively rotatably translated in each of said plurality of directions.

References Cited by the Examiner
UNITED STATES PATENTS
2,745,291   5/1956   Michie.
3,118,312   1/1964   Getz et al.

FOREIGN PATENTS
169,894   10/1921   Great Britain.

DON A. WAITE, *Primary Examiner.*